United States Patent
Kerr et al.

(10) Patent No.: US 8,077,705 B2
(45) Date of Patent: Dec. 13, 2011

(54) SYSTEM AND METHOD FOR PROVIDING END TO END QUALITY OF SERVICE FOR CELLULAR VOICE TRAFFIC OVER A DATA NETWORK

(75) Inventors: Jade Kerr, Kansas City, MO (US); Andrew Cook, Lexena, KS (US); Kevin McBride, Gardner, KS (US); Michael Morrissey, Overland Park, KS (US); Clinton Smoyer, Raymore, MO (US)

(73) Assignee: Embarq Holdings Company, LLC, Overland Park, KS (US)

( * ) Notice: Subject to any disclaimer, the term of this patent is extended or adjusted under 35 U.S.C. 154(b) by 437 days.

(21) Appl. No.: 12/420,193

(22) Filed: Apr. 8, 2009

(65) Prior Publication Data
US 2010/0260100 A1 Oct. 14, 2010

(51) Int. Cl.
*H04L 12/66* (2006.01)

(52) U.S. Cl. ......... 370/352; 370/338; 370/401; 725/111

(58) Field of Classification Search .................. None
See application file for complete search history.

(56) References Cited

U.S. PATENT DOCUMENTS

| 2004/0228356 A1* | 11/2004 | Adamczyk et al. | 370/401 |
| 2009/0198996 A1* | 8/2009 | Lie et al. | 713/155 |
| 2010/0167740 A1* | 7/2010 | Vakil et al. | 455/436 |

* cited by examiner

*Primary Examiner* — Duc C Ho
(74) *Attorney, Agent, or Firm* — Patton Boggs LLP

(57) ABSTRACT

Embodiments of the disclosed invention include a system and method for providing end to end quality of service for cellular voice traffic over a data network. For example, in one embodiment, the method includes tagging outgoing cellular traffic at a network interface device with a prioritization marking to produce prioritized data and transmitting the prioritized data directly to an access carrier network associated with providing an access line to the cellular network interface device. The method maintains, at the access carrier network, the prioritization marking of the outgoing cellular traffic for routing the outgoing cellular traffic through the access carrier network. The method hands off the prioritized data directly to a cellular service provider network associated with the cellular device via a directly connected network to network interface.

18 Claims, 4 Drawing Sheets

SYSTEM AND METHOD FOR PROVIDING END TO END QUALITY OF SERVICE FOR CELLULAR VOICE TRAFFIC OVER A DATA NETWORK

FIELD OF THE INVENTION

The disclosed invention is related to the field of telecommunications, and in particular to providing end to end quality of service for voice traffic over a data network.

BACKGROUND OF THE INVENTION

The disclosed embodiments recognize that voice services transmitted over a data network may suffer where they compete for bandwidth with other devices and/or data applications on a data network. For instance, voice is particularly intolerant to delay if a packet is not received within a specified time and is discarded, thus, causing silence. For example, a bottleneck may occur at a network interface device, where voice traffic competes with other devices to send data through a broadband connection, thus, increasing the chances of packet collisions and delays.

SUMMARY

Embodiments of the disclosed invention include a system and method for providing end to end quality of service for cellular voice traffic over a data network. For example, in one embodiment, the method includes receiving outgoing cellular traffic associated with a cellular device at a cellular network interface device. The method tags the outgoing cellular traffic at the network interface device with a prioritization marking to produce prioritized data and transmits the prioritized data directly to an access carrier network associated with providing an access line to the cellular network interface device via a virtual circuit of the access line. The method maintains, at the access carrier network, the prioritization marking of the outgoing cellular traffic for routing the outgoing cellular traffic through the access carrier network faster than lower level priority data. The method hands off the prioritized data directly to a cellular service provider network associated with the cellular device via a directly connected network to network interface.

BRIEF DESCRIPTION OF THE DRAWINGS

Illustrative embodiments of the present invention are described in detail below with reference to the attached figures, which are incorporated by reference herein and wherein.

DETAILED DESCRIPTION

The disclosed embodiments recognize certain limitations associated with the current methods for routing cellular traffic over a data network, such as, but not limited to, through the use of a femto cell. A femto cell is a small cellular base station that is typically designed for use in residential or small business environments that connect to a service provider's network via a broadband connection, such as, but not limited to, DSL, cable, or a fiber-optic connection for enabling routing of cellular traffic via the Internet. For example, the disclosed embodiments recognize that the cellular traffic in most instances competes with other data transmitted by other devices over the same broadband connection. For instance, in a residential location, several users/devices may be transmitting (uploading or downloading) data over a broadband connection, thereby potentially causing the cellular traffic to be delayed and/or dropped altogether. In addition, the disclosed embodiments recognize that, when routing the cellular traffic over an open/uncontrolled network such as the Internet, unexpected delays may occur. Further, it may not always be cost-effective to dedicate and/or lease an entire access line for providing cellular service over a data network. An access line is a physical line/circuit that connects devices located at a subscriber location to an access carrier network. An access carrier network is private network controlled and operated by a service provider that provides a lease line/connection to a subscriber's location. The access carrier network may communicate with one or more networks for routing data to the appropriate destinations. Accordingly, certain of the disclosed embodiments include a system and method for providing end to end quality of service (QoS) for cellular voice traffic over a data network that overcomes one or more of the above recognized limitations. As referenced herein, quality of service is the ability to provide different priority to different applications, users, or data flows, or to guarantee a certain level of performance to a data flow, such as, but not limited to, cellular voice traffic.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, or process in which different embodiments may be implemented.

Figure 1:
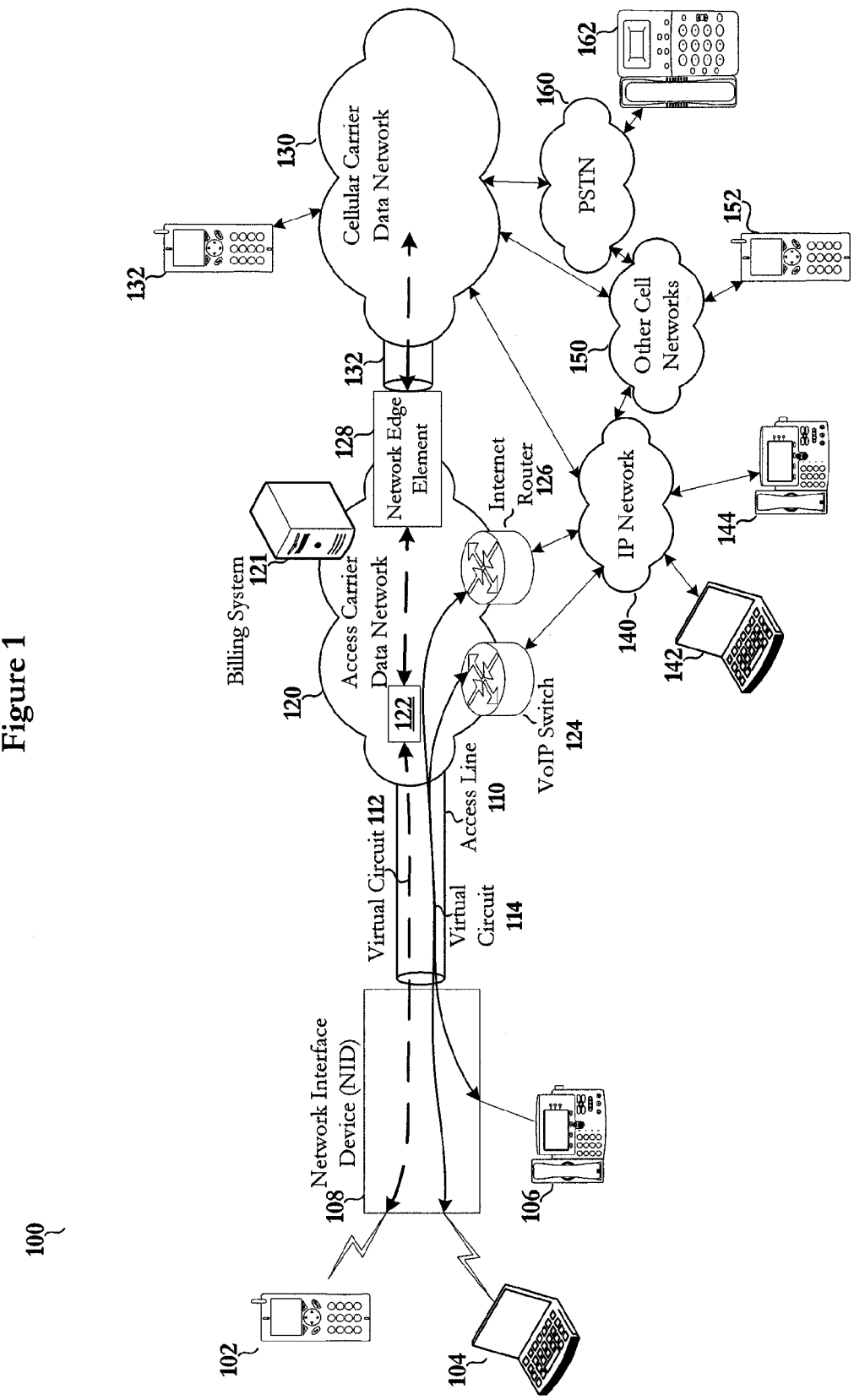
FIG. 1 depicts an embodiment a network environment in which the illustrative embodiments may be implemented.

With reference now to FIG. 1, an embodiment of a network environment 100 in which the illustrative embodiments may be implemented is depicted. In the depicted embodiment, network environment 100 includes a network interface device (NID) 108 for connecting one or more devices at a subscriber location to a remote network via an access line 110 connected to an access carrier data network 120. Network interface device 108 serves as the demarcation point between the carrier's local loop and the customer's network. A demarcation point is the point at which a telephone/cable company network, such as, access carrier data network 120, ends and connects with the wiring at the customer premises. A local loop, also referred to as a subscriber line, depicted as access line 110, is the physical link or circuit that connects from the demarcation point (i.e., network interface device 108) of the customer premises to the edge of the carrier or telecommunications service provider's network (i.e., access carrier data network 120).

For example, in some embodiments, network interface device 108 may be an optical network terminal (ONT), also commonly referred to as an optical network unit (ONU), that sends and receives data via a fiber-optic cable connected to the carrier or telecommunications service provider's network. The optical network terminal is responsible for converting optical signals to electrical signals and vice-versa. In one embodiment, the ONT (i.e., network interface device 108) may include a cellular transceiver for enabling a cellular device to communicate with other devices via the ONT, instead of through a cellular macro network. Additionally, in some embodiments, network interface device 108 may be a cable, Ethernet, or digital subscriber line (DSL) modem with integrated cellular capabilities for enabling a cellular device to communicate with other devices. Alternatively, in some embodiments, network interface device 108 may be a femto cell configured to perform the disclosed method for providing end to end quality of service for cellular voice traffic over a data network.

In one embodiment, a cellular device 102 may utilize network interface device 108 to communicate with other telecommunication devices, such as, but not limited to, voice over IP (VoIP) phone 144, cellular phone 152, and/or landline telephone 162. In addition, in some embodiments, a data processing system, such as, but not limited to, data processing system 104, may utilize network interface device 108 to communicate with other telecommunication devices, such as, data processing system 142. Further, in some embodiments, network interface device 108 may be configured to provide VoIP services to a VoIP phone, such as, VoIP phone 106.

In accordance with one embodiment, access line 110 may be provisioned into a plurality of virtual circuits/channels. For instance, the available bandwidth (i.e., the width of the range (or band) of frequencies) available for data transmission on access line 110 may be divided into two or more separate virtual circuits/channels, such as, but not limited to, a virtual circuit 112 and a virtual circuit 114. For instance, in one embodiment, a connection may be established via virtual circuit 112 between network interface device 108 and a telephone switch 122 located at a central office within access carrier data network 120 for transferring cellular voice traffic between network interface device 108 and access carrier data network 120. Telephone switch 122 is a system of electronic components that connects and/or routes telephone calls. As will be further described, in accordance with the disclosed embodiments, cellular voice traffic transmitted from network interface device 108 is tagged/marked with a prioritization indicator to identify the cellular traffic as high priority traffic (e.g., using the IEEE 802.1p standard for indicating priority level). In one embodiment, network interface device 108 segregates the high priority traffic, such as, cellular voice traffic associated with cellular device 102, from lower priority traffic, such as, but not limited to, data traffic associated with data processing system 104 and/or VoIP phone 106, and transmits the high priority traffic on virtual circuit 112 and the lower priority traffic on virtual circuit 114 to access carrier data network 120. Thus, in one embodiment, traffic on virtual circuit 112 of the access line 110 is not impacted by traffic on other data paths of access line 110, such as, but not limited to, virtual circuit 114.

Further, in accordance with one embodiment, access carrier data network 120 is configured to maintain the prioritization indicator associated with the cellular voice traffic for providing high priority routing of the cellular voice traffic to a network edge element 128 associated with access carrier data network 120. In one embodiment, network edge element 128 is an internetworking system capable of joining together two networks that use different base protocols, e.g., a network gateway. In some embodiments, network edge element 128 may be implemented completely in software, completely in hardware, or as a combination of both. Additionally, in some embodiments, depending on the types of protocols that network edge element 128 supports, network edge element 128 may operate at any level of the OSI model. In addition, because network edge element 128, appears at the edge of a network, related capabilities like firewalls may be integrated with network edge element 128.

In one embodiment, network edge element 128 may connect directly with a system, such as, but not limited to, a telephone switch, router, or a network edge element associated with a cellular carrier data network 130 via a network to network interface (NNI) 132 for handing off the cellular voice traffic directly to cellular carrier data network 130. Cellular carrier data network 130 is a cellular service provider associated with providing cellular service to cellular device 102. Network to network interface 132 specifies signaling and management functions between two networks, such as, access carrier data network 120 and cellular carrier data network 130. For example, in some embodiments, network to network interface 132 may be used for interconnection of either signaling (e.g. SS7), IP (e.g. MPLS), or ATM networks.

Accordingly, the disclosed embodiments maintain a quality of service for cellular voice traffic communicated from a network interface device to a cellular carrier data network over a data network, such as, but not limited to, access carrier data network 120. Once cellular carrier data network 130 receives the cellular voice traffic, cellular carrier data network 130 routes the cellular voice traffic to the appropriate destination. For example, if the cellular voice traffic is directed towards another cellular device associated with the same cellular service provider as that of cellular device 102, such as, cellular device 134, cellular carrier data network 130 routes the cellular voice traffic directly to cellular device 134. However, if the cellular voice traffic is directed towards a cellular device associated with a different cellular service provider, such as, but not limited to, cellular device 152, cellular carrier data network 130 may route the cellular voice traffic to the another cellular network 150. Additionally, cellular carrier data network 130 may route the cellular voice traffic to a public switched telephone network (PSTN) 160 for routing the voice traffic to landline telephone 162. Public switched telephone network 160 is the standard circuit-switch telephone network, consisting generally of copper wires for carrying analog voice data, utilized by most homes.

Further, in some embodiments, cellular carrier data network 130 may route the cellular voice traffic to a VoIP equipped device, such as, but not limited to, data processing system 142 and/or voice over IP (VoIP) phone 144 via IP network 140. In one embodiment, IP Network 140 may include one or more data networks, such as, but not limited to, the Internet, for routing communications between one or more communication devices and/or data processing systems. The Internet is a global system of interconnected computer networks that interchange data using the standardized Internet Protocol Suite (TCP/IP). Additionally, IP Network 140 may include other types of data networks, such as, but not limited to, an intranet, a private local area network (LAN), a wide area network (WAN), and a wireless local area network (WLAN). In some embodiments, IP Network 140 may communicate with one or more networks, such as, but not limited to, a cellular carrier data network 130 and public switched telephone network 160 for providing services to a plurality of subscribers.

In addition, in some embodiments, quality of service is maintained for cellular voice traffic communicated back to network interface device 108 from cellular carrier data network 130. For example, in one embodiment, in response to cellular carrier data network 130 receiving cellular voice traffic directed to cellular device 102, the cellular voice traffic is tagged with a prioritization marking to produce prioritized data. The prioritized data is given preferential treatment (e.g., the prioritized data is routed faster throughout cellular carrier data network 130 than lower level priority data, such as, but not limited to, best effort data) to maintain a quality of service and ensure its full and timely delivery from the cellular carrier data network 130 to access carrier data network 120. In one embodiment, access carrier data network 120 maintains the prioritization marking of the incoming prioritized data in routing the incoming prioritized data to network interface device 108. In some embodiments, access carrier data network 120 may utilize virtual circuit 112 for transferring the incoming cellular voice traffic to network interface device 108. Alternatively, in other embodiments, access carrier data network 120 may utilize a separate virtual circuit for transferring the incoming cellular voice traffic to network interface device 108.

Additionally, in accordance with one embodiment, a billing system 121 may monitor the amount of data handed off/communicated between access carrier data network 120 and cellular carrier data network 130 for billing the cellular service provider associated with cellular carrier data network 130 based on the amount of cellular voice traffic handled by access carrier data network 120. Thus, in some embodiments, a cellular service provider is not required to lease the entire access line to provide end-to-end quality of service for cellular voice traffic as presented in the disclosed embodiments. For example, in one embodiment, cellular carrier data network 130 may share access line 110 with access carrier data network 120. For instance, access carrier data network 120 may provide Internet and/or VoIP phone services to the same subscriber(s) utilizing network interface device 108. Additionally, access carrier data network 120 may include one or more VoIP telephone switch 124 and/or Internet router 126 for providing VoIP phone service and Internet access to VoIP phone 106 and data processing system 104.

Figure 2:
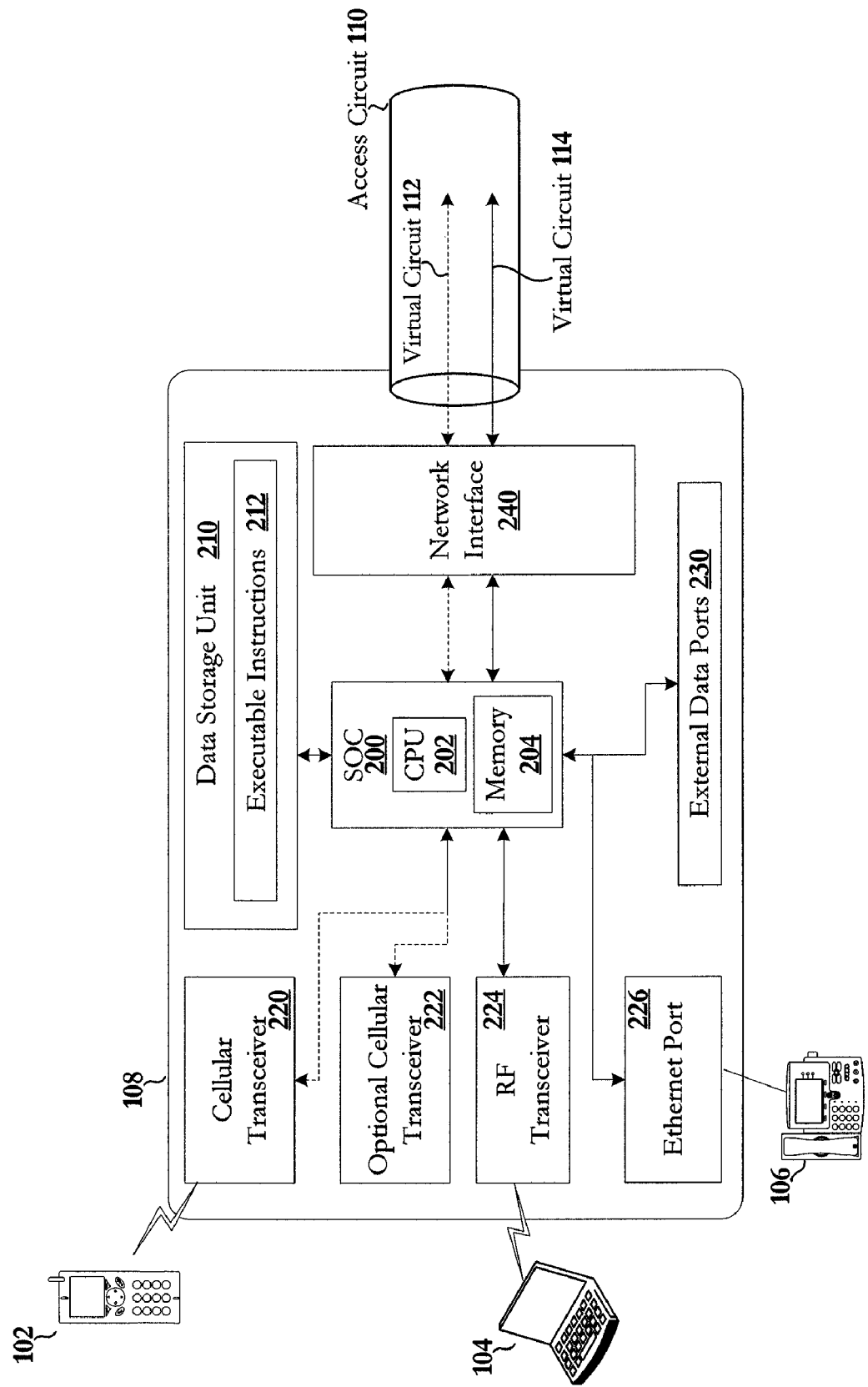
FIG. 2 depicts an embodiment of a cellular network interface device in accordance with the illustrative embodiments.

FIG. 2 depicts an embodiment of network interface device 108 in accordance with the illustrative embodiments. In one embodiment, network interface device 108 includes a system-on-a-chip (SoC) 200. In some embodiments, SoC 200 may integrate all or a majority of the components of network interface device 108, such as, but not limited to, processing unit 202 and memory 204, into a single integrated circuit chip. In some embodiments, SoC 200 may include digital, analog, mixed-signal, and radio-frequency functions.

In one embodiment, processing unit 202 may include one or more processing cores, such as, but not limited to, a microcontroller, microprocessor or digital signal processor, for executing instructions and processing data associated with the functions and features of network interface device 108. Additionally, memory 204 may be volatile memory, i.e., memory that loses its contents when network interface device 108 loses power. For example, in some embodiments, memory 204 may be random access memory (RAM). Random access memory stores currently executing instructions and/or other data utilized by an operating system, software program and/or hardware device.

In addition, in some embodiments, network interface device 108 may include one or more data storage unit 210. Data storage unit 210 is non-volatile memory, such as, but not limited to, a hard disk drive, that stores permanent data until deleted. For example, in some embodiments, data storage unit 210 may store executable instructions 212. In some embodiments, executable instructions 212 may include executable instructions associated with an operating system associated with network interface device 108 and/or other applications executing on network interface device 108. For example, in some embodiments, executable instructions 212 may include instructions for marking cellular voice traffic with a prioritization tag/indicator and segregating and/or controlling the different levels of data based on priority level. Additionally, in some embodiments, network interface device 108 may include one or more external data ports 230. For example, in one embodiment, external data ports 230 may include a universal serial bus (USB) port for connecting a USB flash drive to network interface device 108 for providing external data storage.

In accordance with one embodiment, network interface device 108 may include a cellular transceiver 220 for sending and receiving cellular signals. In some embodiments, cellular transceiver 220 may be configured to send and receive cellular signals associated with a particular cellular service provider. Alternatively, in some embodiments, cellular transceiver 220 may be configured to send and receive cellular signals associated with a particular type of cellular network, such as, but not limited to, a Global System for Mobile communications (GSM) network, a 2G/3G/4G network, and/or a Code Division Multiple Access (CDMA) network. Optionally, in some embodiments, network interface device 108 may include multiple cellular transceivers, such as, optional cellular transceiver 222. For instance, in some embodiments, optional cellular transceiver 222 may be configured to operate on a different cellular network type and/or a different cellular service provider than that associated with cellular transceiver 220.

In accordance with one embodiment, cellular voice traffic received by cellular transceiver 220 and/or optional cellular transceiver 222 are processed by SoC 200. In one embodiment, SoC 200 marks all cellular voice traffic with a prioritization tag/indicator and passes the cellular voice traffic to a network interface 240. Alternatively, in some embodiments, SoC 200 may mark only particular cellular voice traffic with a prioritization tag/indicator and/or may provide different levels of priority for cellular voice traffic based on the particular cellular device. For example, in one embodiment, a user/subscriber may desire that only a particular cellular device or group of cellular devices be given priority over other data. In these embodiments, a user may configure network interface device 108 to mark only the cellular voice traffic associated with the desired cellular device(s). In other embodiments, network interface device 108 may be configured to mark all cellular voice traffic received from cellular transceiver 220 with a prioritization tag/indicator and to treat cellular voice traffic received from optional cellular transceiver 222 at a lower priority level.

In addition, in some embodiments, network interface device 108 may include a radio frequency (RF) transceiver 224. In one embodiment, radio frequency transceiver 224 supports the Wireless Application Protocol (WAP) for communicating data wirelessly to one or more devices, such as, but not limited to, to data processing system 104. For instance, data processing system 204 may communicate with radio frequency transceiver 224 for accessing data on the Internet. Additionally, in some embodiments, network interface device 108 may include an Ethernet port 226 for enabling a device/data processing system, such as, VoIP phone 106 and/or data processing system 104, to physically connect to network interface device 108.

In accordance with one embodiment, network interface 240 may be configured to transmit only prioritized data/cellular voice traffic directly to access carrier data network 120 via virtual circuit 112 of access line 110. In these embodiments, network interface 240 may be configured to transmit all other lower priority data, such as, but not limited to, data received from radio frequency transceiver 224 and/or Ethernet port 226, to access carrier data network 120 via virtual circuit 114. Alternatively, in some embodiments, network interface 240 may be configured to transfer data associated with each priority level on separate virtual channels.

Figure 3:
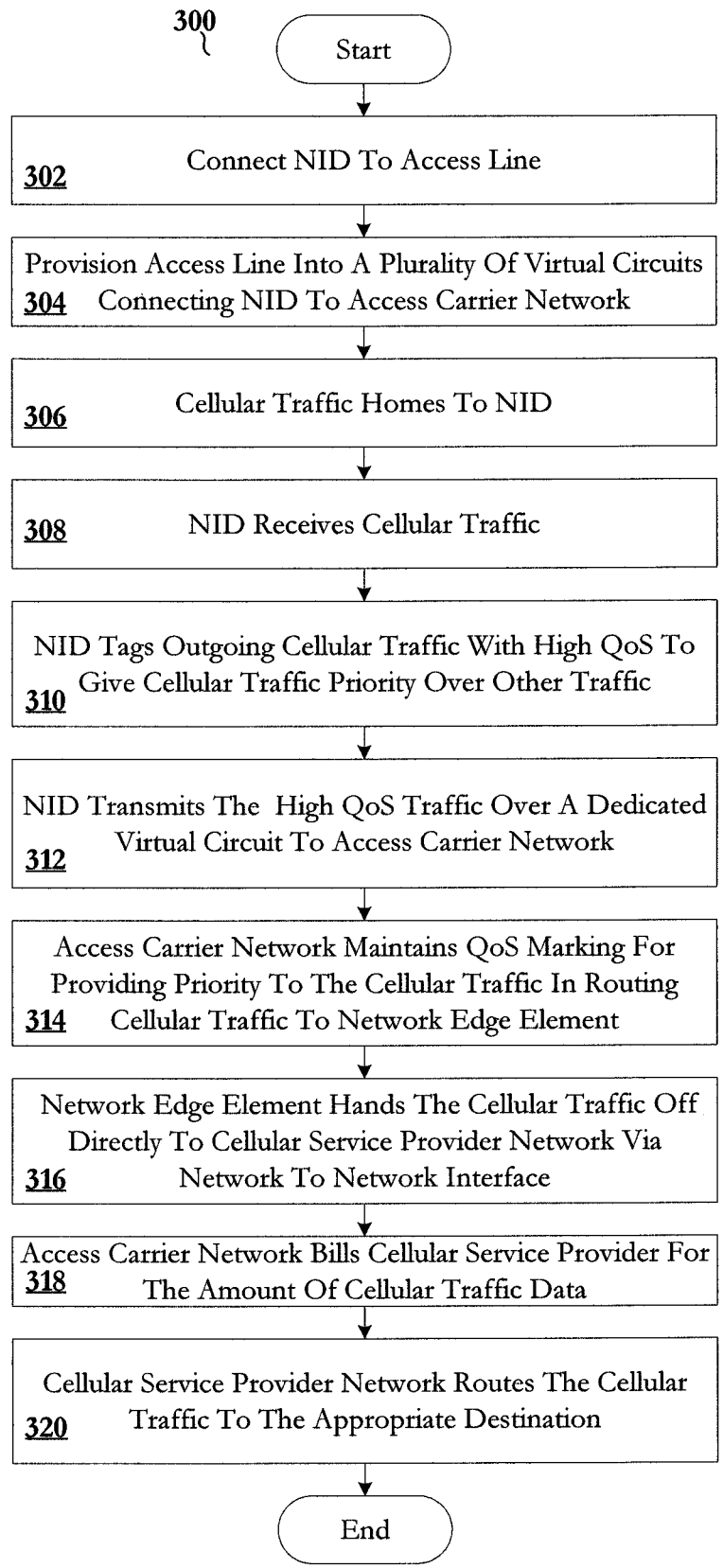
FIG. 3 depicts a flowchart illustrating an embodiment of a process for providing end to end quality of service for outgoing cellular voice traffic over a data network.

FIG. 3 depicts a flowchart illustrating an embodiment of a process 300 for providing end to end quality of service for outgoing cellular voice traffic over a data network. Process 300 begins by, connecting the network interface device to an access line and establishing communication between the network interface device and an access carrier data network. At step 304, the access line is provisioned into a plurality (two or more) of virtual circuits connecting the network interface device to the access carrier data network. At step 306, cellular devices within range of the network interface device homes/switches over from using the macro cellular network to routing the cellular traffic through the network interface device. The process, at step 308, receives the cellular traffic and tags the cellular voice traffic as priority data/traffic, at step 310, for providing a high quality of service for the cellular voice traffic. At step 312, the process transmits the priority traffic over a dedicated virtual circuit to an access carrier data network.

At step 314, the access carrier data network maintains the high QoS marking for the cellular voice traffic in routing the cellular voice traffic through the access carrier data network to a network edge element. At step 316, the network edge element hands off the cellular voice traffic directly to a cellular service provider network via a network to network interface. In one embodiment, the access carrier, at step 318, monitors and bills the cellular service provider for the amount of cellular traffic data that is handed off to the cellular service provider network. At step 320, the cellular service provider network routes the cellular voice traffic to the appropriate destination, with process 300 terminating thereafter.

Figure 4:
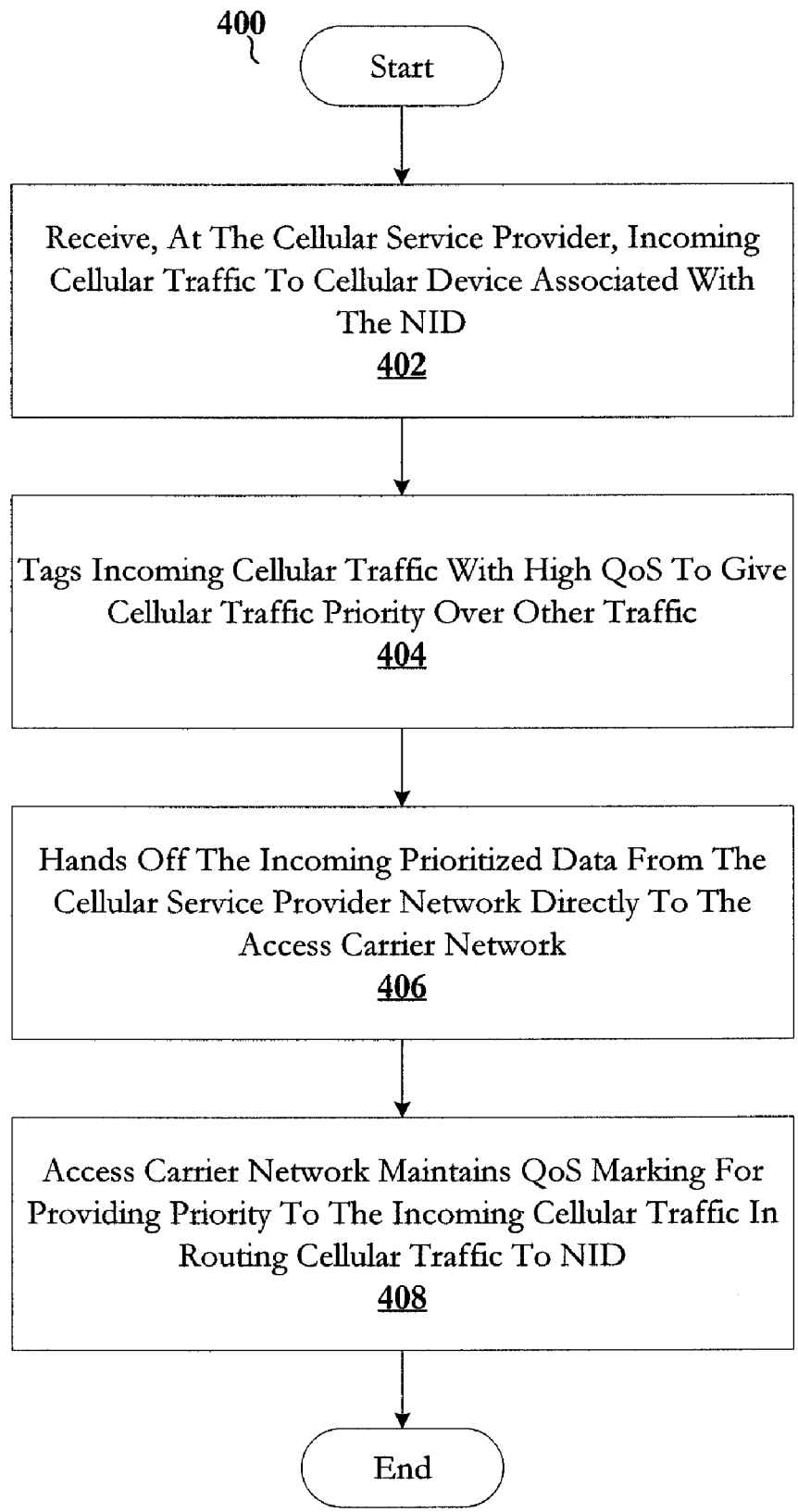
FIG. 4 depicts a flowchart illustrating an embodiment of a process for providing end to end quality of service for incoming cellular voice traffic over a data network.

FIG. 4 depicts a flowchart illustrating an embodiment of a process 400 for providing end to end quality of service for incoming cellular voice traffic to a network interface device. Process 400 begins, at step 402, by receiving, at the cellular service provider network, incoming cellular traffic to a cellular device homed to a cellular network interface device, such as, network interface device 108. The process, at step 404, tags the incoming cellular traffic with a priority indicator for providing high quality of service to the cellular traffic. At step 406, the process hands off the prioritized cellular voice traffic to an access carrier network associated with providing the access line to the cellular network interface device. At step 408, the access carrier network maintains the priority marking on the cellular voice traffic for providing quality of service in routing the cellular voice traffic through the access carrier network to the network interface device, with process 400 terminating thereafter.

Accordingly, the disclosed embodiments, maintains a quality of service for cellular voice traffic communicated via a network interface device to a cellular carrier data network over a data network by directly handing off cellular voice traffic from an access carrier data network to a cellular service provider network instead of routing the cellular voice traffic over the Internet. Advantages of the disclosed embodiments include guaranteeing a quality of service for cellular voice traffic transmitted over a data network, thereby, preventing delays and/or dropped data packets associated with cellular voice traffic. In addition, the disclosed embodiments provide for a cost-effective method for providing end-to-end quality of service for cellular voice traffic by billing a cellular service provider based on an amount of cellular voice traffic data that is handled by the access carrier data network instead of by requiring a cellular service provider to lease an access line.

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

We claim:

1. A method for providing end to end quality of service for cellular voice traffic over a data network, the method comprising:
- receiving outgoing cellular traffic associated with a cellular device at a network interface device;
- tagging the outgoing cellular traffic at the network interface device with a prioritization marking to produce prioritized data;
- transmitting the prioritized data to an access carrier network associated with providing an access line to the network interface device via a virtual circuit of the access line;
- maintaining, at the access carrier network, the prioritization marking of the outgoing cellular traffic for routing the outgoing cellular traffic through the access carrier network at a higher priority than lower level priority data; and
- handing off the prioritized data directly to a cellular service provider network associated with the cellular device via a directly connected network to network interface.

2. The method claim 1, further comprising:
- receiving, at the cellular service provider network, incoming voice traffic directed to the cellular device;
- tagging the incoming voice traffic with a prioritization marking to produce incoming prioritized data;
- handing off the incoming prioritized data from the cellular service provider network to the access carrier network; and
- maintaining, at the access carrier network, the prioritization marking of the incoming prioritized data for routing the incoming prioritized data to the network interface device via the virtual circuit of the access line connected to the network interface device, and wherein the incoming prioritized data moves faster through the access carrier network than lower level priority data.

3. The method of claim 1, further comprising establishing the virtual circuit between the network interface device and a telephone switch at the access carrier network.

4. The method of claim 1, wherein the virtual circuit is allocated to strictly the prioritized data.

5. The method of claim 1, further comprising configuring the network interface device to enable the cellular device to use the network interface device for routing cellular traffic.

6. The method of claim 1, wherein the cellular service provider does not lease the access line from the access carrier network.

7. The method of claim 1, further comprising the access carrier billing the cellular service provider based on an amount of prioritized data being handed off to the cellular service provider.

8. The method of claim 1, wherein the network interface device is a femto cell.

9. The method of claim 1, wherein the network interface device is an optical network terminal incorporated with a femto cell.

10. The method of claim 1, wherein the network interface device is a cable modem incorporated with a femto cell.

11. The method of claim 1, wherein traffic on the virtual circuit of the access line is not impacted by traffic on other data paths of the access line.

12. A network interface device for providing end to end quality of service for voice traffic over a data network, the network interface device comprising:
- a cellular transceiver for sending and receiving cellular signals from a cellular device;
- a data storage unit for storing computer executable instructions;
- a processing unit for executing the computer executable instructions for tagging outgoing cellular traffic associated with the cellular signals with a prioritization marking to produce prioritized data; and
- a network interface configured to transmit the prioritized data directly to an access carrier network associated with providing an access line to the network interface device via a virtual circuit of the access line.

13. The network interface device of claim 12, further comprising:
- a radio frequency transceiver for sending and receiving radio frequency waves from a wireless device; and
- the network interface further configured to segregate transmission of data associated with the wireless device from the prioritized data to provide quality of service to the prioritized data.

14. The network interface device of claim 12, wherein the radio frequency transceiver sends and receives the data associated with the wireless device using Wireless Application Protocol.

15. The network interface device of claim 12, wherein the virtual circuit is established between the network interface device and the access carrier network.

16. The network interface device of claim 12, further comprising a second cellular transceiver for sending and receiving cellular signals of a different type than that of the cellular transceiver.

17. The network interface device of claim 12, wherein the network interface device is incorporated with an optical network terminal.

18. The network interface device of claim 12, wherein the network interface is further configured to receive incoming priority voice traffic directly from the access carrier network via the virtual circuit of the access line.

* * * * *